United States Patent [11] 3,559,918

| [72] | Inventor | Carl Braun<br>8500 Nurnberg, Germany (c/o Carl Braun Camera-Werk, Muggenhofer Strasse 122, Germany) |
|---|---|---|
| [21] | Appl. No. | 762,837 |
| [22] | Filed | Sept. 26, 1968 |
| [45] | Patented | Feb. 2, 1971 |
| [32] | Priority | Oct. 3, 1967, May 15, 1968 |
| [33] | | Germany |
| [31] | | 1,597,122 and 772,436 |

[54] FILM PROJECTOR
11 Claims, 19 Drawing Figs.

[52] U.S. Cl. .................................................. 242/198, 352/78
[51] Int. Cl. ...................................... G03b 1/04, G11b 15/32, G11b 23/04
[50] Field of Search ........................................... 242/71.1, 71.2, 198—200; 352/72—78

[56] References Cited
UNITED STATES PATENTS
| 3,227,508 | 1/1966 | Bavaro | 352/72 |
| 3,431,047 | 3/1969 | Lancor, Jr. | 352/72 |

*Primary Examiner*—Leonard D. Christian

ABSTRACT: A boxlike film cartridge for use in projectors and having a tangentially arranged film exit opening. The cartridge is arranged to be carried on a pivoting door of the projector housing and carries a film clamping means which is arranged to clamp the film when the motor is automatically switched off by the end of the film passing through the picture gate at the end of rewind, in advance of cessation of rotation of the motor, so as to prevent the film being withdrawn entirely into the cartridge.

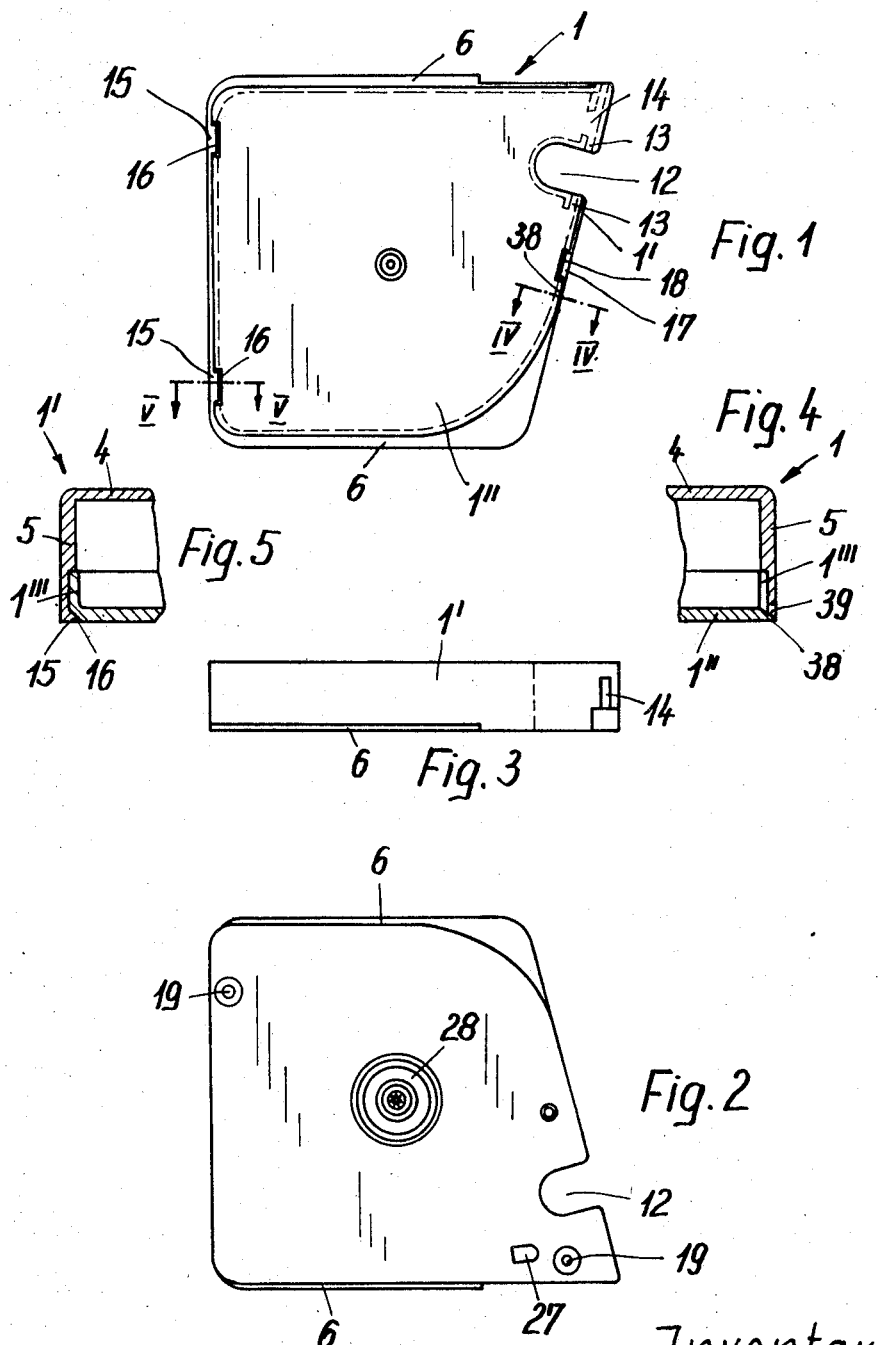

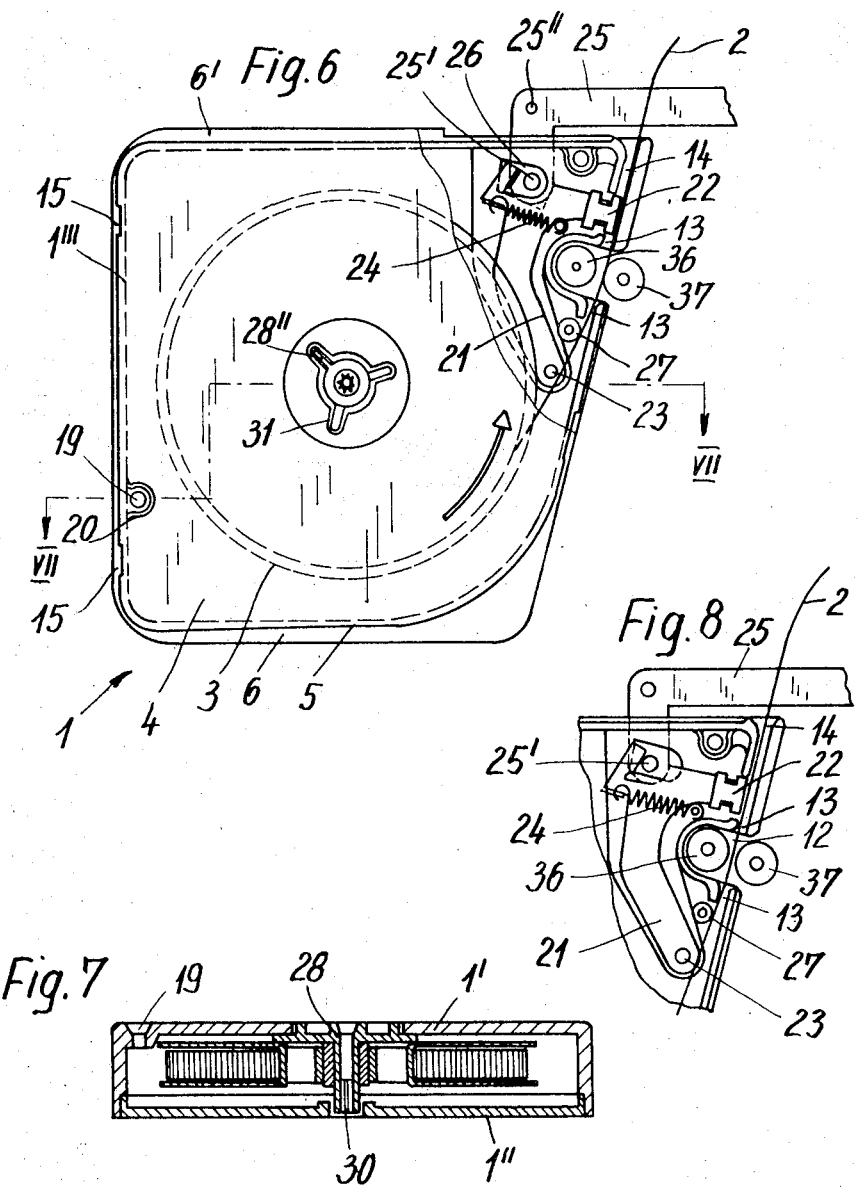

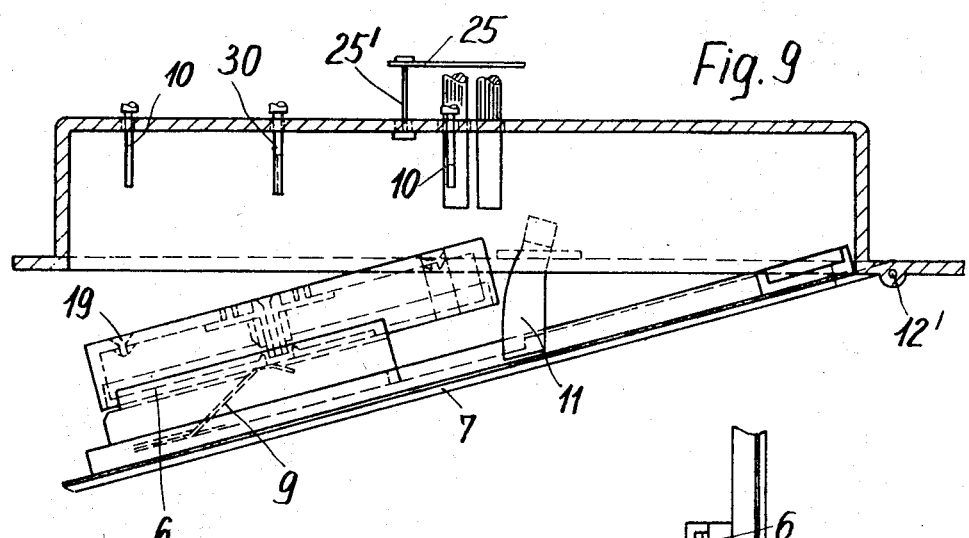
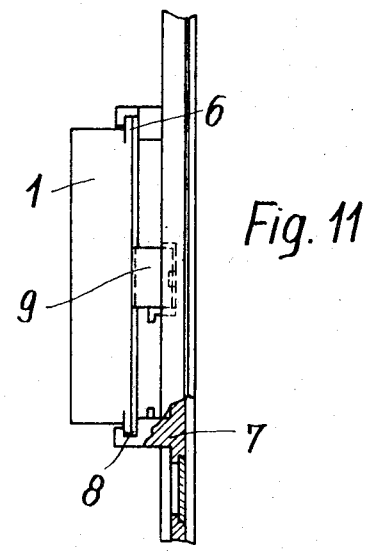
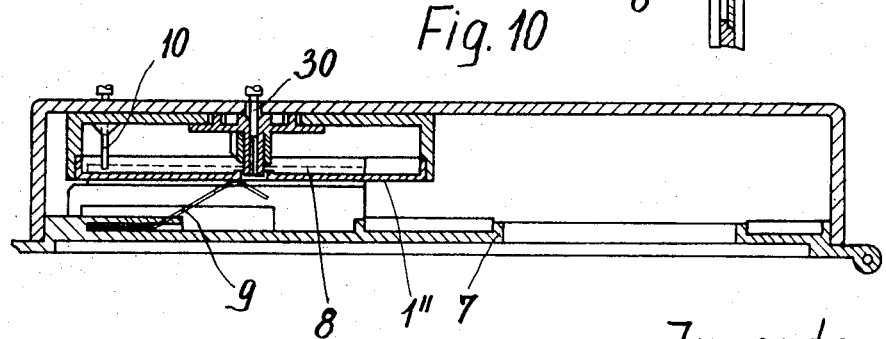

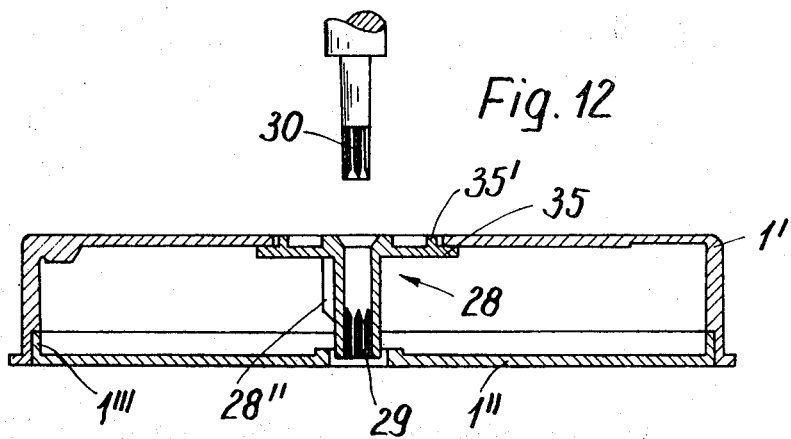
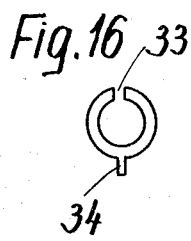
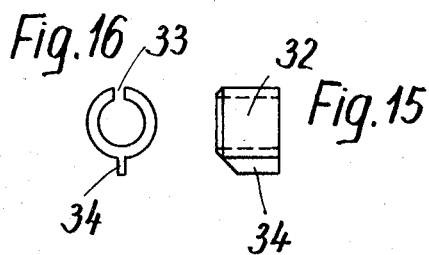
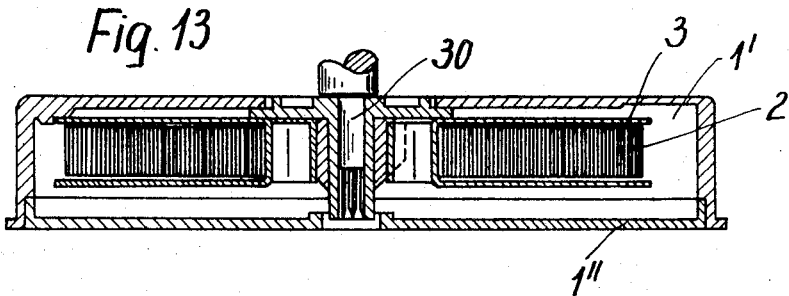

Inventor

FILM PROJECTOR

The present invention relates to film cassettes or cartridges for projectors.

Known cassettes or cartridges serve for receiving and storing the film as wound on a bobbin. Such cartridges are provided with a film exit opening through which the film is drawn during projection and drawn back during rewinding.

One object of the invention is to provide a film cartridge which is simple in construction.

A further object of the invention is to provide a film cartridge which can rapidly be placed in position satisfactorily and cooperates with a film projector in mechanically simple manner.

In accordance with the invention a film cartridge comprises a dish- or box-shaped part forming a rear wall and has a skirt with a film exit opening, the cartridge being closed by a lid in the manner of a box.

A film cassette constructed in this manner facilitates insertion and removal of a film bobbin and the positioning of the film in the film exit opening.

In accordance with a further feature of the invention the film cassette can be held by means of rails on the projector housing, for instance on a part of the projector housing in the form of a door. For forming these rails the rear wall of the cartridge can extend beyond the skirt. The projector door can be provided with grooves for receiving the rails. Additionally, locating pins can be provided on the projector housing for insertion into recesses in the cartridge, the recesses extending into at least one of the two parts of the cartridge, that is to say into the lid or into the dish-shaped part. In order to hold the two parts of the cartridge together in such a manner that they can be separated projections or the like can be provided which interlock and hold the two parts together.

In the case of film projectors which for drawing the film out of the cartridge from the bobbin have transport rollers, handling of the film cartridge in accordance with the invention can be simplified by recessing the skirt so as to form a pocket into which the transport rollers fit and through which the film is guided by means of slits in the adjacent skirt portion.

Furthermore means can be provided with a bush or the like serving for coupling the bobbin with a rotary driving part or shaft forming part of the projector. Preferably the bush is arranged to have the bobbin placed over it and to receive the shaft of the projector in a recess in it in such a manner as to make a positive connection.

In order to hold the film in the cassette, the latter can be provided with a clamp which is released by an actuator, for instance in the form of a solenoid forming part of the projector and acting against a spring holding the clamp against the film.

In accordance with a still further feature of the invention the cartridge is provided with a roller for guiding the film through the slits being the film through the pocket, and through the film exit opening.

An embodiment of the invention is now described with reference to the accompanying drawing.

FIG. 1 shows a film cassette or cartridge in accordance with the invention from the front.

FIG. 2 shows a cartridge from the rear.

FIG. 3 shows the film cassette from above.

FIG. 4 is a section on the line IV-IV of FIG. 1.

FIG. 5 is a section on the line V-V of FIG. 1.

FIG. 6 shows a film cassette or cartridge with a film bobbin and film clamp in the working position.

FIG. 7 is a section on the line VII-VII of FIG. 6.

FIG. 8 is a view of part of the cartridge with the film clamp open.

FIG. 9 is a view of the film cartridge in plan attached to a door of the projector in the open position.

FIG. 10 is a view corresponding to FIG. 9 with the door closed.

FIG. 11 is a side view of a film cartridge attached to the projector door as shown in FIG. 9.

FIG. 12 shows a film cartridge with a coupling rotary bush and a driving part or driving spigot, in section, on a larger scale.

FIG. 13 is a section of the cartridge corresponding to FIG. 12 with the driving means in position.

FIG. 14 shows the rotary bush in section.

FIGS. 15 and 16 are two views of a further component of the projector.

Figure 17:
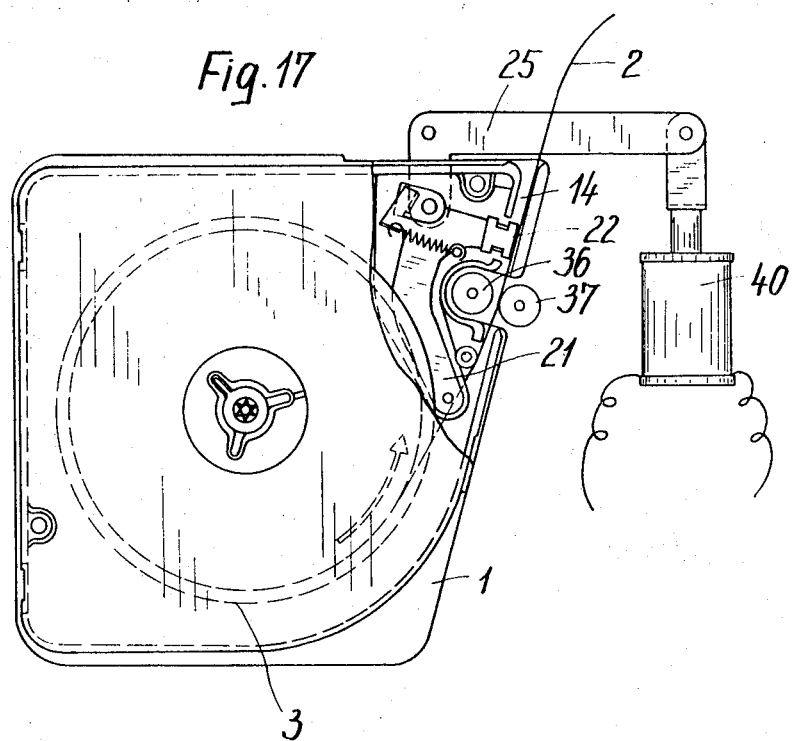
FIG. 17 shows the film cartridge with the clamp in the clamping position.

Referring now to the drawings and more particularly to FIGS. 1 through 6, it can be seen that the film cartridge or cassette 1 embodying the invention comprises a film bobbin 3 (FIG. 6) carrying a film 2. The cassette is formed by a dish-shaped part 1' (see in particular FIGS. 4, 5 and 7) forming a rear wall 4 and ending at a rim into which a lid 1'' is inserted. The skirt forms a sidewall of the cartridge while the lid 1'', which is preferably flat, serves as the front wall of the cartridge. As shown in FIGS. 1 to 3 and 11 the cartridge is provided with rails 6 which lie in the same plane as the rear wall 4 and extend beyond the skirt 5. The rails, which are parallel, serve as male interlocking means which fit in a door 7 of the housing as shown in FIGS. 9 to 11. For this purpose the door 7 is provided with grooves 8 serving as female interlocking means. A resilient spring 9, see more particularly FIGS. 9 and 10, serves to prevent the cartridge sliding in the grooves 8. By swinging the housing door 7 out of the position as shown in plan in FIG. 9 into the position shown in FIG. 10, the cartridge is brought into engagement with locating pins 10 fixed to the housing of the projector, the pins 10 fitting into recesses or holes 19 which extend into at least one part of the cartridge, that is to say at least into the dish-shaped part. The recesses 19 extend into reinforced parts of the rear wall 4 as indicated by reference numeral 20 (see FIG. 6). The door 7, which is hinged about a pivot pin 12' (see FIG. 9), is provided with a stay 11 which engages the housing, as shown in FIG. 9 so as to limit pivoting movement of the door, but can be bent so as to come out of engagement with the housing so as to allow the door to be opened through a wide angle.

The dish-shaped part 1' of the cartridge and the lid 1'' are recessed at 12 (see FIGS. 1, 2, 6 and 8) to form a pocket limited by a recessed part of the skirt 5. This part of the skirt is provided with two openings or slits 13 leading through the pocket (see FIGS. 6 and 8) so as to allow the film to pass out from the bobbin 3 through the pocket 12 and through a film exit opening or exit slot 14 as shown in FIGS. 6 and 8. When the cartridge is in the working position as shown in FIG. 10, that is to say with the projector door 7 closed, a constantly rotating transport roller 36 driven by the motor of the projector, extends into the pocket and cooperates with a jockey roller 37 in propelling the film out of the cartridge. The film exit opening 14 and the slits 13 (see FIGS. 3, 6 and 8) are all open at their ends adjacent to the lid 1'' so that when the lid is removed the film can be laid in their open ends by moving the film in a direction perpendicular to its length, instead of having to thread the film through the slits and the opening.

The two cartridge parts, that is to say the dish-shaped part 1' and the lid 1'' are held together by means of lips 15 (see FIGS. 1 and 5) which overlap the lid 1'' where the latter has recesses 16 so as to form a hinge allowing the lid to pivot about an axis close to the lips 15. In the opposite part of the sidewall or skirt 5 there is a lug 17 (see FIG. 1) which serves as a spring catch or releasable interlocking means fitting into a recess 18 of the cartridge part 1''. Furthermore, as shown in FIG. 4, the cartridge lid 1'' is provided with an opening ridge 38 which serves for facilitating opening of the lid and fits into a recess 39 in the skirt 5. The lid 1'' is provided with an inner skirt portion 1''' similar to a flange which fits into the skirt 5 so as to provide for a precise engagement of the lid with the skirt.

As shown in FIGS. 6, 8 and 17 the part of the cartridge adjacent to the film exit opening 14 carries a clamp or clamping lever 21 which pivots about a pin 23. The clamp is provided with a jaw 22 which is held by a spring 24 against the film 2 to lock movement of the film.

The clamp 21 has an upper portion adjacent to an opening 26 in the rear wall 4 through which a pin 25' on the projector extends when the cartridge is in the operating position as shown in FIG. 10. As shown in FIGS. 6 and 9 the pin 25' is carried on a bell crank 25 pivoted at 25'' and connected with actuating means for causing the pin 25' to move in a clockwise direction about pin 25'' and retract jaw 22 out of engagement with the film 2.

As is shown in FIG. 17, the actuating means comprises a solenoid 40 with a vertically sliding armature pivoted to the right-hand end of bellcrank 25. The solenoid 40 is energized by operation of the drive motor 41 which is shown diagrammatically in the two circuit diagrams of FIGS. 18 and 19 which represent alternative constructions.

Figure 18:
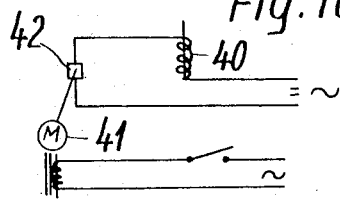
FIG. 18 is a circuit diagram of actuating means for the clamp.

In the construction in accordance with FIG. 18 a centrifugal switch 42 is arranged to be driven by the motor 41 and to be switched on when the motor reaches a certain speed of rotation and to close again when the motor slows down again. As a result when the motor reaches a certain speed the bellcrank 25 is swung in a clockwise direction by the solenoid 40 so that the film clamp releases the film while slowing down or stopping of the motor leads to the film being clamped again by the spring 24 acting on the clamp 21 with its jaw 22 for engaging the film 2.

Figure 19:
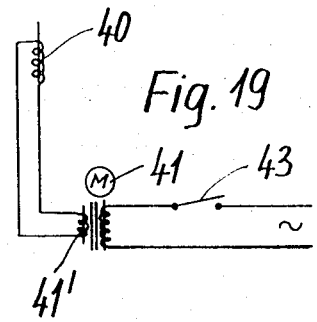
FIG. 19 shows a circuit diagram of a further, alternative, actuating means for the film clamp.

FIG. 19 represents a simpler construction than that of FIG. 18 and in it inductive coupling of the solenoid with the drive motor 41 is arranged for. For this purpose the drive motor 41 is provided with an additional winding 41' which is placed in circuit with the solenoid 40. During the time in which the motor 41 is switched on, the voltage induced in the additional winding 41' energizes the solenoid 40 so that the clamp 21 is retracted from the film while on switching off the drive motor 41 the solenoid is deenergized and clamp reengages the film 2.

The drive motor is operated by a manual switch which is not shown. The switch 43 shown in the construction of FIG. 18 or of FIG. 19 serves to sense the presence of film at a position adjacent to the gate of the projector. That is to say if film is positioned in the gate, the switch 43 is closed while when there is no film at this position, the switch 43 opens and switches off the motor automatically. In known projectors having such a film-sensing motor switch for automatically switching of the motor there is the disadvantage that owing to inertia of the motor at the end of rewind the film bobbin continues to rotate sufficiently to withdraw the end of the film completely into the cartridge so that the cartridge must be opened for extracting the end of the film again. This is avoided with the construction of FIG. 18 or FIG. 19 in which owing to the provision respectively of the centrifugal switch or the inductive coupling clamping of the film in the cassette is arranged to take place before the motor ceases to rotate.

The cartridge part 1' is provided with a guide roller 27 (see FIGS. 6, 8 and 17) which serves to guide the film with extremely little friction through the slits 13 and the film exit opening 14.

Although it is possible to arrange the film bobbin 3 loosely in the cassette or cartridge 1 so that it is supported by the skirt 5, in the construction shown in the FIGS. the bobbin 3 is carried on a rotary bush or coupling body 28 (see FIGS. 6 and 7). This bush has recesses 29 into which splines or teeth on a rotary driving part or shaft 30 fit as is shown in FIG. 13. When the door 7 is closed the shaft 30 readily slides into the bush 28 without any guidance by the operator. The bush 28 is provided with a projection or radial ridge 28'' (see FIGS. 6 and 12) which fits into recess 31 in the bobbin 3. Alternatively a non-positive frictional engagement between the bobbin and the bush 28 can be provided for. The tubular part 28' (see FIG. 14) is provided with an external diameter which corresponds to the internal diameter of the central hole in the bobbin.

FIGS. 15 and 16 show an intermediate or adapter sleeve for fitting on the bush 28 in order to adapt it for use bobbins having larger holes, for instance for super 8 film instead of normal 8 film. The adapter sleeve 32 is provided with a receiving slot 33 for the projection 28'' and with a projection 34 which fits into one of the radial recesses 31 of the bobbin with a larger hole. Cooperation of the parts 28'', 31, 32, 33, and 34 provides for a positive connection between the shaft 30 and the film bobbin 3. The bush 28 has a flangelike rim portion 35 which abuts against the rear wall 4 of the cassette while a collar 35' provides for radial guiding of the bush 28 in the cartridge.

I claim:

1. In a film projector comprising an electric drive motor and a housing, the invention which consists in the provision of a film cartridge or cassette comprising:

a dish-shaped cartridge part having a planar portion forming a rear wall of the cartridge and a skirt part extending from the periphery of the planar part generally at a right angle to it to terminate at a rim lying in a plane which is plane-parallel to the rear wall, the skirt part having a slit defining a film exit opening for passage of film out of the cartridge for projection; and a planar lid held so that its edge is adjacent to the rim, the lid being plane-parallel to the rear wall, the cartridge being mounted on the projector, and interlocking sliding means made up of a male interlocking component in the form of rail means and a female interlocking component in the form of groove means, one of these components being on the cartridge and the other on the housing of the projector, the rail means lying generally in the same plane as the rear wall of the cartridge.

2. The cartridge as set forth in claim 1 further comprising locating pins mounted on the projector housing and extending into holes in at least one of the two parts of the cartridge.

3. The cartridge as set forth in claim 1 in which the dish-shaped part of the cartridge comprises lip means arranged to overlap an edge of the lid part, and releasable interlocking means engaging the lid at a part remote from the lip means, the lid part being arranged to swivel about an axis close to the lip means.

4. The cartridge as set forth in claim 1 comprising a transport roller mounted on the projector housing and extending into a pocket formed by a recessed part of the skirt, an aperture being provided for guiding film out of the cartridge through the pocket for engagement by the roller.

5. The cartridge as set forth in claim 1 comprising a rotary bush in the cartridge, a film-carrying spool mounted on the bush, the bush positively engaging the spool, and a rotary driving part on the projector housing for fitting into a hole in the bush for rotating it.

6. The cartridge as set forth in claim 1 in which at a position close to the cartridge opening the cartridge comprises a spring-loaded film clamp, the projector comprising actuating means arranged to engage the clamp and to move it resiliently out of engagement with the film.

7. The cartridge as set forth in claim 6 comprising means coupling the motor with the clamp actuating means and arranged to causing clamping of the film in advance of cessation of rotation of the motor.

8. The cartridge as set forth in claim 7 comprising as the actuating means, a solenoid, and means for automatically energizing the solenoid when the film drive motor of the projector is running.

9. The cartridge as set forth in claim 8 comprising centrifugally operated switch means for switching the solenoid on and off in accordance with operation of the drive motor.

10. The cartridge as set forth in claim 8 comprising inductively operated means coupling the motor with the solenoid.

11. The cartridge as set forth in claim 1 comprising a guide roller mounted in the cartridge for guiding film out of the cartridge through the film exit opening.